United States Patent [19]

Inada et al.

[11] 3,942,844

[45] Mar. 9, 1976

[54] ANTI-SKID CONTROL SYSTEMS INCLUDING AN EMERGENCY ACCUMULATOR FOR BRAKING AND SKID CONTROL OPERATIONS

[75] Inventors: Masami Inada, Toyoake; Toshiyuki Kondo, Toyota, both of Japan

[73] Assignee: Aisin Seiki Kabushiki Kaisha, Japan

[22] Filed: Aug. 15, 1974

[21] Appl. No.: 497,639

[30] Foreign Application Priority Data

Aug. 21, 1973 Japan.............................. 48-94070
Aug. 22, 1973 Japan.............................. 48-94081

[52] U.S. Cl. .......................... 303/21 AF; 303/21 F
[51] Int. Cl.² ........................................... B60T 8/06
[58] Field of Search .......... 303/21 F, 21 AF, 61–63, 303/68–69, 10; 188/181 A, 106 P

[56] References Cited
UNITED STATES PATENTS

| | | | |
|---|---|---|---|
| 3,503,655 | 3/1970 | Heimler.............................. | 303/21 F |
| 3,738,712 | 6/1973 | Flory ................................ | 303/21 F |
| 3,813,130 | 5/1974 | Inada................................. | 303/21 F |

*Primary Examiner*—Trygve M. Blix
*Assistant Examiner*—Douglas C. Butler
*Attorney, Agent, or Firm*—Stevens, Davis, Miller & Mosher

[57] ABSTRACT

An actuator arranged between a hydraulic brake master cylinder and vehicle wheels for permitting the delivery therethrough of the braking pressure from the former to the latter includes solenoids responsive to signals from a computer which is adapted to sense the skidding of the wheels. Upon actuation of the solenoids, fluid pressure is no longer introduced into the actuator from a pump, as through a brake booster operatively connected to the brake pedal of the motor vehicle on the one hand and to the brake master cylinder on the other hand, so that the actuator suspends the delivery of the braking pressure to the wheels pending the cessation of the skidding. An accumulator is provided for delivering fluid pressure to the actuator, for example, in the event of the malfunctioning of the pump.

11 Claims, 7 Drawing Figures

ANTI-SKID CONTROL SYSTEMS INCLUDING AN EMERGENCY ACCUMULATOR FOR BRAKING AND SKID CONTROL OPERATIONS

BACKGROUND OF THE INVENTION

This invention relates to antiskid controls for motor vehicles, and in particular to an antiskid control system operatively associated with a brake booster in an open-type fluid control system.

As is well known, the braked wheels of a motor vehicle often skid or slide without rotating, as when the brake pedal is depressed too abruptly, when the road is slippery, and/or when the vehicle has been overspeeding. In order to recover the vehicle wheels from such skidding condition, it is necessary to immediately release the once-applied brakes and to allow the vehicle to run until its wheels stop skidding. This procedure may have to be repeated several times until the vehicle becomes properly braked. It is desirable that this antiskid function be performed automatically and efficiently by the braking system of the motor vehicle, since the skidding of the wheels can result in serious accidents.

SUMMARY OF THE INVENTION

It is, therefore, an object of this invention to provide a novel and improved antiskid control system incorporated in a braking system of a motor vehicle whereby the vehicle can be smoothly and positively recovered from skidding condition and can be properly braked.

Another object of the invention is to provide an antiskid control system wherein the fluid pressure supplied to a brake booster is further delivered to an actuator adapted to control the delivery of braking pressure from a brake master cylinder to the vehicle wheels, thereby realizing the economical use of the fluid pressure, and wherein the brake booster can be supplied with the fluid pressure even during operation of the actuator so that the reliability of the brake booster is materially enhanced.

A further object of the invention is to provide an antiskid control system including an accumulator that may be arranged between a source of fluid pressure and the brake booster, whereby the antiskid function can be achieved even in the event of the malfunctioning of the fluid pressure source of like trouble.

A further object of the invention is to provide an antiskid control system including a first accumulator for supplying fluid pressure to the brake booster in the event of the malfunctioning of the fluid pressure source, for example, and a second accumulator for supplying fluid pressure to the actuator in the event of the trouble, whereby the antiskid function can be achieved even while the fluid pressure source is not operating normally.

A still further object of the invention is to provide an antiskid control system including bypass means for directing the braking pressure from the brake master cylinder to the vehicle wheels in the event of the malfunctioning of the fluid pressure source, for example, whereby the braking function can be accomplished even while the fluid pressure source is not operating normally.

According to the antiskid control system of this invention, briefly described in one aspect thereof, a brake booster operatively coupled to the brake pedal of the motor vehicle is arranged between a source of fluid pressure and a brake master cylinder. An actuator is arranged between the brake master cylinder and the vehicle wheels for controlling the delivery of braking pressure from the former to the latter. Normally, upon depression of the brake pedal, the fluid pressure from the source is introduced into the brake booster to permit the same to effect fluid pressure actuation of the brake master cylinder, and this fluid pressure from the source is further supplied to the actuator, whereupon the latter permits the delivery therethrough of the braking pressure from the master cylinder to the wheels, thereby braking the same.

Upon skidding of the wheels, a computer senses the fact and immediately causes the actuator to suspend the delivery of the braking pressure to the wheels pending the termination of the skidding condition. Since it is possible that the fluid pressure source will fail to develop the required fluid pressure, an accumulator is provided to deliver fluid pressure to the brake booster and thence to the actuator in such cases. The antiskid control operation can therefore be accomplished even in the event the source fails to deliver the fluid pressure to the actuator.

The features which are believed to be novel and characteristic of this invention are set forth with particularity in the appended claims. The invention itself, however, both as to its organization and mode of operation, together with the further objects and advantages thereof, will be best understood from the following detailed description of preferred embodiments of the invention when taken in conjunction with the accompanying drawings wherein like reference characters denote like parts throughout the several views or diagrams.

DETAILED DESCRIPTION

Figure 1:
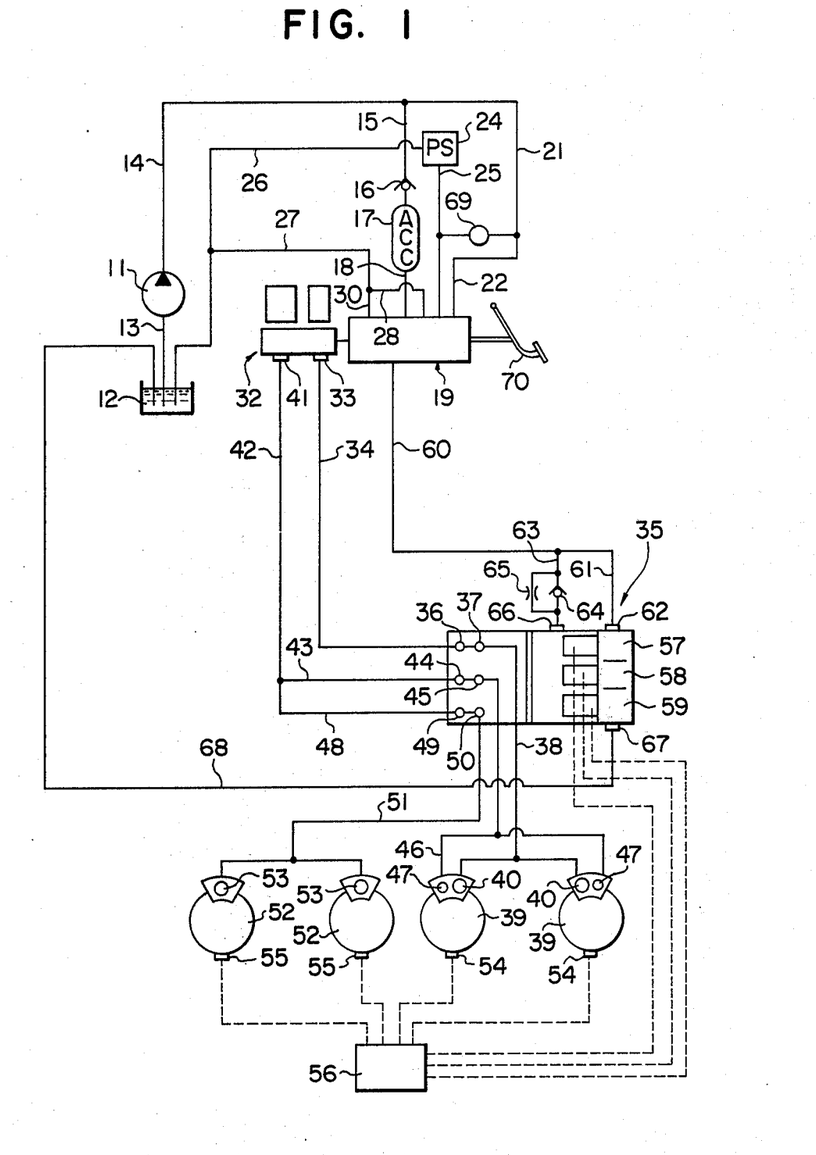
FIG. 1 is a schematic diagram of the antiskid control system in accordance with the novel concepts of this invention.

With particular reference to FIG. 1, which diagrammatically illustrates a preferred form of the antiskid control system according to the invention, there is shown at 11 a pump of known construction adapted to be driven by the motor vehicle engine, not shown, for raising the hydraulic fluid from within a reservoir 12 via a conduit 13. The pump 11 is thus caused to develop the required hydraulic pressure in a conduit 14 communicating with an emergency accumulator 17 via a conduit 15 and a check valve 16. The emergency accumulator 17 communicates with a port 20 (FIG. 2) of a hydraulic brake booster generally designated by the numeral 19. The aforesaid conduit 14 also communicates with a groove 23 (FIG. 2) of the brake booster 19 via conduits 21 and 22.

Indicated at 24 in FIG. 1 is a power steering mechanism of known construction which communicates, on the one hand, with the brake booster 19 via a conduit 25 and, on the other hand, with the reservoir 12 via a control valve of known construction, not shown, and a conduit 26. A conduit 27 branching off from the conduit 26 is connected, on the one hand, to a port 29, FIG. 2, of the brake booster 19 via a conduit 28 and, on the other hand, to a port 31, FIG. 2, of the brake booster via a conduit 30.

A tandem master cylinder generally labeled 32 is operatively connected to the brake booster 19 in a well known manner. A port 33 of this tandem master cylinder communicates with a port 36 of an actuator 35, shown in greater detail in FIG. 3, via a conduit 34. The port 36 communicates with brake controls 40 of respective front wheels 39 of the motor vehicle via port 37 and conduit 38. Another port 41 of the tandem master cylinder 32 communicates, on the one hand, with a port 44 of the actuator 35 via conduits 42 and 43 and, on the other hand, with a port 49 of the actuator via conduits 42 and 48. The port 44 of the actuator 35 communicates with brake controls 47 of the respective front wheels 39 via a port 45 and a conduit 46. The port 49 of the actuator 35 communicates with brake controls 53 of respective rear wheels 52 via a port 50 and a conduit 51.

The front and rear wheels 39 and 52 of the motor vehicle are provided with sensors 54 and 55, respectively, which are adapted to produce electrical signals representative of the rotating speeds of the respective wheels. The signals from the respective sensors 54 and 55 are delivered to a computer 56 of known type and kind adapted to detect the skidding of the wheels. This computer 56 is further electrically connected to three units 57, 58 and 59 constituting the actuator 35. The actuator unit 57 is adapted to control the delivery of the hydraulic pressure to the brake controls 40 of the front wheels 39 in response to the commands of the computer 56. The actuator unit 58 is adapted to control the delivery of the hydraulic pressure to the brake controls 47 of the front wheels 39 in response to the computer commands. The actuator unit 59 is adapted to control the delivery of the hydraulic pressure to the brake controls 53 of the rear wheels 52 in response to the computer commands.

A conduit 60 extending from the brake booster 19 is connected, on the one hand, to a port 62 of the actuator 35 via a conduit 61 and, on the other hand, to a port 66 of the actuator via a conduit 63 and a check valve 64 or orifice 65. A port 67 of the actuator 35 communicates with the reservoir 12 via a conduit 68. A relief valve 69 bridging the conduits 21 and 25 is adapted to open at an appropriately lower pressure than the relief valve built in the pump 11. Shown at 70 is the brake pedal of the motor vehicle that is operatively coupled to the brake booster 19 in the usual manner.

Figure 2:
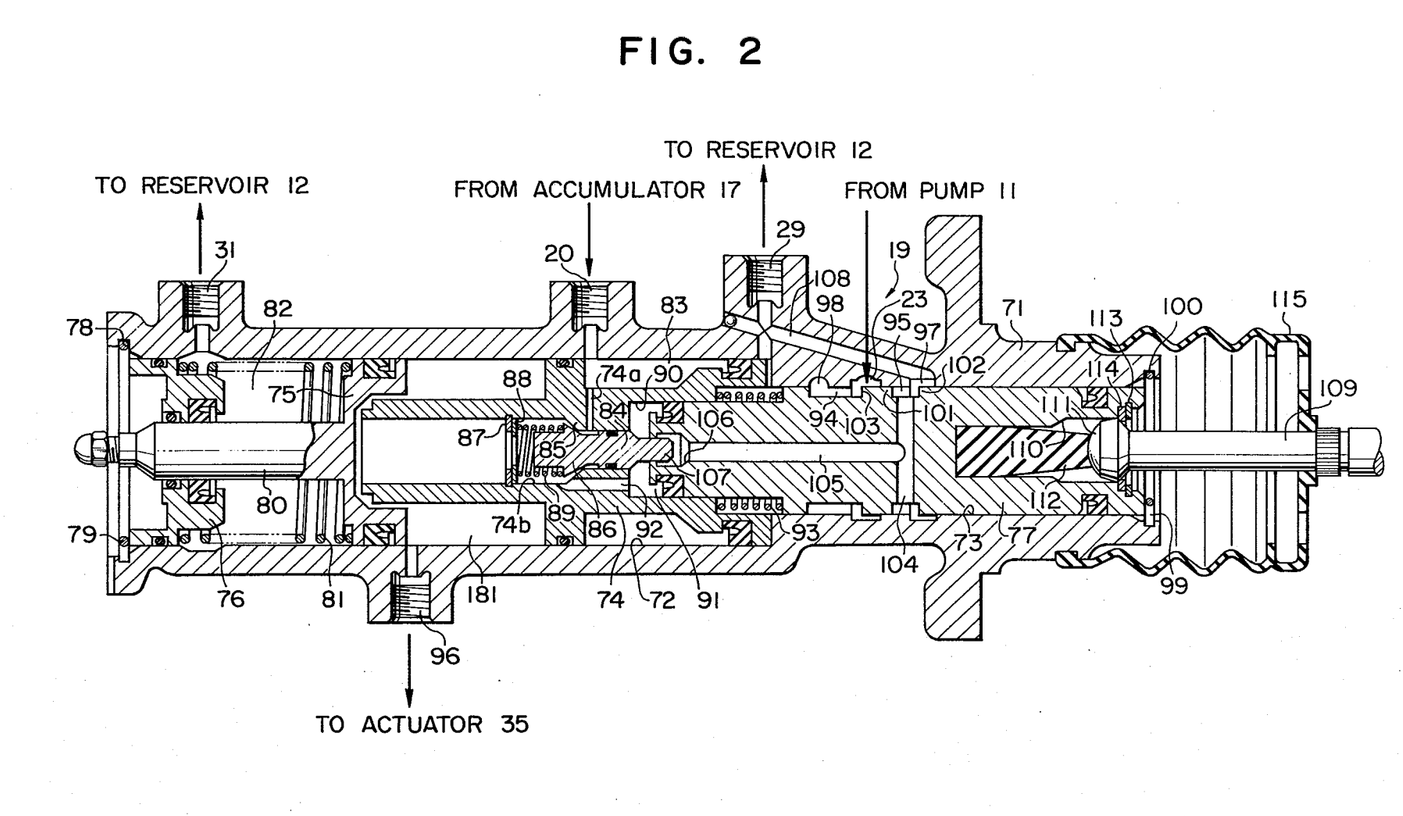
FIG. 2 is a side view, in longitudinal section, showing a brake booster used in the antiskid control system illustrated in FIG. 1.

FIG. 2 illustrates the constructional details of the brake booster 19, which includes a sleeve-like housing 71 comprising a unitary large diameter cylinder 72 and small diameter cylinder 73 in axial alignment. Slidably mounted within the large diameter cylinder 72 is a valve seat piston 74, a power piston 75 and a divider 76. A reactive piston 77 is slidably mounted within the small diameter cylinder 73. The divider 76 is restrained from falling off the large diameter cylinder 72 by means of a stop ring 79 partly received in a groove 78. A piston rod 80 formed integral with the power piston 75 slidably extends through the divider 76, the piston rod 80 extending in the axial direction of the housing 71.

A restoring helical compression spring 81 is accommodated between the power piston 75 and the divider 76, whereby the divider is urged against the stop ring 79 while the power piston 75 is urged to the right as seen in FIG. 2. A hydraulic fluid chamber 82 defined between the power piston 75 and divider 76 is in open communication with the port 31 formed through the housing 71 and thence with the reservoir 12 via the conduits 30 and 27, as will be seen by referring back to FIG. 1. Similarly, a hydraulic fluid chamber 83 defined between the valve seat piston 74 and the large diameter cylinder 72 is in open communication with the port 20 formed through the housing 71 and thence with the emergency accumulator 17 via the conduit 18.

A valve 84 disposed coaxially relative to the valve seat piston 74 includes a shoulder portion 86 disposed opposite to a valve seat 85 formed internally of the valve seat piston. A helical compression spring 89 extends between the valve 84 and a retainer 88 mounted within the valve seat piston 74 via a snap ring 87, so that the valve is biased in a direction such that its shoulder portion 86 will seat against the valve seat 85. The valve seat piston 74 has passageways 74a and 74b therethrough whereby, upon unseating of the valve shoulder portion 86 from the valve seat 85, the fluid chamber 83 communicates with a fluid chamber 181 between the valve seat piston 74 and the power piston 75.

The left hand end portion, as seen in FIG. 2, of the reactive piston 77 is slidably received in a bore 90 formed coaxially relative to the valve seat piston 74, thereby defining a reactive fluid chamber 91 within the latter. This fluid chamber 91 is in open communication with the fluid chamber 181 via a passageway 92 and the aforesaid passageway 74b. A restoring helical compression spring 93, capable of resisting significantly less compressive force than the first mentioned restoring spring 81, is arranged between the valve seat piston 74 and the reactive pistion 77 thereby biasing the former leftwardly and, by reaction, biasing the latter rightwardly.

Two annular grooves 94 and 95 are formed in the circumference of the reactive piston 77 intermediate between the two ends thereof. Correspondingly, the groove 23, another groove 97 and a port 98 are formed in the housing 71. The relative positions of these grooves and port are such that when the reactive piston 77 is held in abutting contact with a stop ring 100 partly fitted in an annular groove 99 at the right hand end of the housing 71, the groove 94 intercommunicates the groove 23 and the port 98. Also in this reactive piston position, the groove 95 is discommunicated from the groove 23 by a reactive piston shoulder 101 but is in complete communication with the groove 97. Upon leftward travel of the reactive piston from its illustrated position, a reactive piston shoulder 102 discommunicates the grooves 95 and 97 one with respect to the other. Instead, the groove 95 communicates with the groove 23, and a reactive piston shoulder 103 constricts the degree of communication between the groove 23 and the port 98.

Normally, the groove 95 is held in communication with the reactive fluid chamber 91 via diametric passageway 104 and axial passageway 105 formed through the reactive piston 77. However, upon seating of the beveled end portion 107 of the valve 84 against a valve seat 106 by the leftward travel of the reactive piston 77, the groove 95 becomes discommunicated from the fluid chamber 91. As previously mentioned in connection with FIG. 1, the groove 23 has the conduit 22 connected thereto. The groove 97 is in open communication with the port 29 via a passageway 108 formed through the housing 71, and this port 29 directly communicates with the conduit 28 and thence with the conduit 27. The port 98 communicates via the conduit 25 with the inlet of the power steering mechanism 24, which is one of the operating mechanisms of the open-type hydraulic system, and the outlet of this power steering mechanism communicates with the reservoir 12 via the conduit 26.

A push rod 109, pivotally connected at one end to the brake pedal 70, has an enlarged head 111 at its other end which is received in an axial bore 110 of the reactive piston 77. The enlarged head 111 of the push rod 109 is supported by a resilient member 112 and a retainer 114, the latter being fixedly mounted at the right hand end of the reactive piston 77 via a snap ring 113. Dustproof bellows 115 is provided to cover the right hand end of the housing 71 and the stem portion of the push rod 109.

Figure 3:
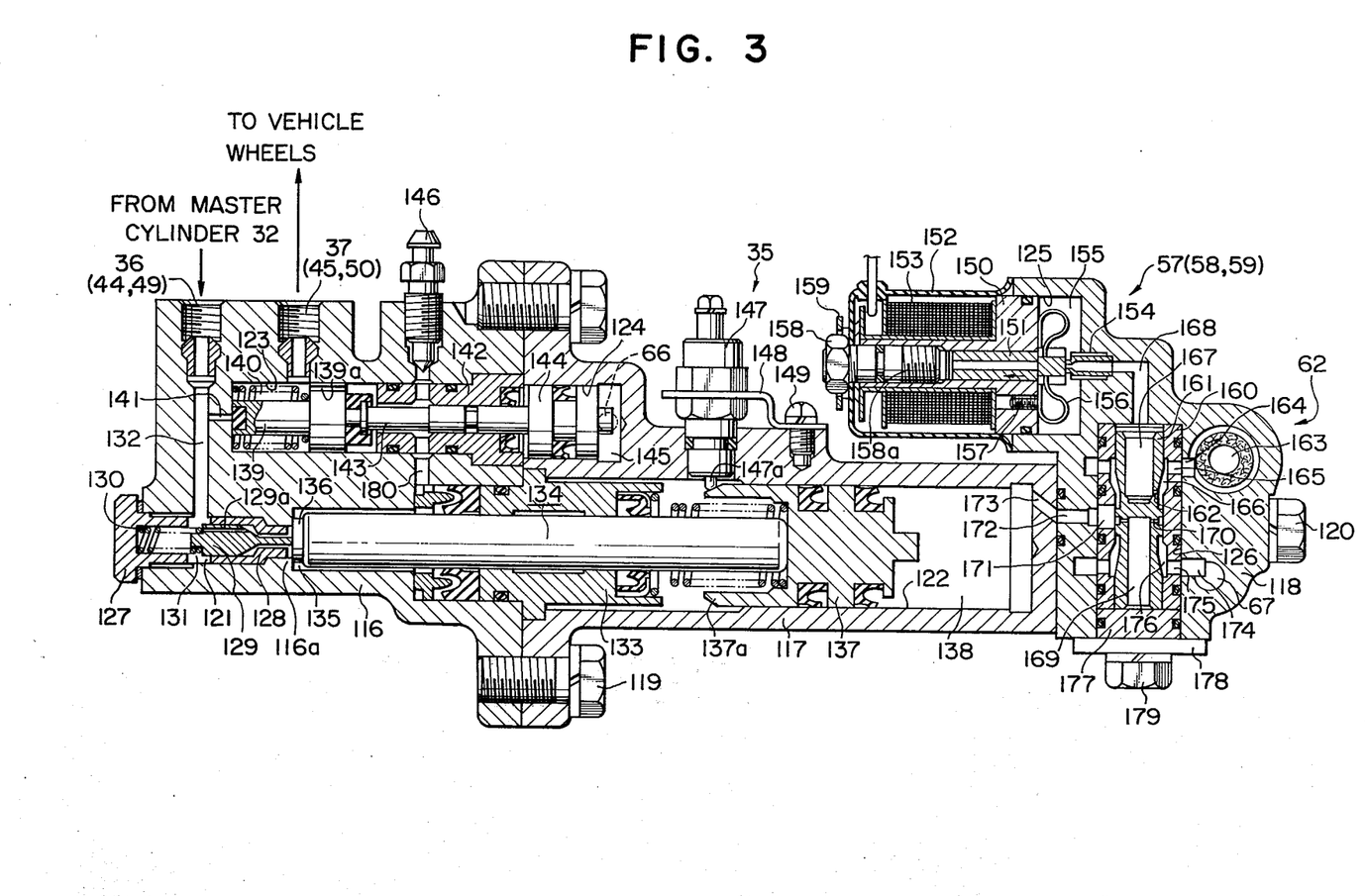
FIG. 3 is a side view, in longitudinal section, showing an actuator used in the antiskid control system of FIG. 1.

FIG. 3 illustrates the detailed configuration of the actuator unit 57, it being understood that the other actuator units 58 and 59 are of identical configuration. The illustrated actuator unit 57 comprises three individual housings 116, 117 and 118. The housings 116 and 117 are rigidly joined together by means of a plurality of bolts 119, and the housings 117 and 118 by means of a plurality of bolts 120. Formed through the housings 116 and 117 are bores 121 and 122 and bores 123 and 124 that are arranged in axial alignment respectively. The housing 118 has bores 125 and 126 therethrough.

The bore 121 of the housing 116 has its left hand end, as seen in FIG. 3, closed by a plug 127 that is screwthreadedly fitted therein. A valve seat member 128 is mounted within the bore 121 for cooperation with a valve 129 having a passageway 129a therethrough. A helical compression spring 130 extends between the plug 127 and the valve 129 so that the latter tends to seat against the valve seat member 128. A fluid chamber 131 accommodating the spring 130 communicates with the aforementioned port 36 via a passageway 132.

A stationary member 133 is mounted in the bore 122, and a plunger 134 slidably extends axially of the stationary member 133 to define a reduced pressure chamber 135 on its left hand side. When an extension 136 of the plunger 134 is in abutting contact with a step 116a of the bore 121, as illustrated in FIG. 3, the valve 129 is displaced out of contact with the seat member 128 against the bias of the spring 130. Upon rightward travel of the plunger 134 from its illustrated position, the spring 130 functions to urge the valve 129 into contact with the seat member 128. The right hand end of the plunger 134 is in abutting engagement with a piston 137 slidably mounted in the bore 122. A fluid chamber 138 is defined in the bore 122 to exert a leftward hydraulic pressure on the piston 137 and hence the plunger 134.

A piston 139 having a passageway 139a therethrough is slidably mounted in the bore 123 that is axially aligned with the bore 124. The piston 139 defines a fluid chamber 140 on its left hand side in communication with the port 37. The housing 116 has a passageway 141 communicating the port 36 with the fluid chamber 140. A plunger 143 slidably extends coaxially through a stationary member 142 mounted in the bore 123, the plunger 143 abutting at its left hand end against the piston 139 and at its right hand end against a piston 144 slidably mounted in the bore 124. A fluid chamber 145 defined on the right hand side of the piston 144 communicates with the port 66.

An air bleeder is mounted at 146. A switch 147 is affixed to the housing 117 by a nut 149 via a fixture 148. This switch 147 includes an actuator 147a projecting into the bore 122 to rest against a sloping surface 137a on the left hand end of the piston 137 when the latter is in the position illustrated in FIG. 3. Upon rightward travel of the piston 137 and the plunger 134 from their illustrated position, and therefore upon seating of the valve 129 against the seat member 128, the switch 147 will be turned off.

A retainer 150 is partly fitted in the bore 125, and a plunger 151 slidably extends axially of the retainer 150. A housing 152 rigidly joined to the housing 118 accommodates a solenoid coil 153 therein. A nozzle 154 mounted within the housing 118 is adapted to have its opening controllably varied in step with the slide motion of the plunger 151 through the retainer 150. A spring 156 accommodated in a chamber 155 defined in the bore 125 is affixed to the retainer 150 by screws, not shown, and working force of this spring is adjustable by a screw 157. On the left hand side of the plunger 151, a bolt 158a for the solenoid coil 153 is affixed to the retainer 150 via nut 158. The reference numeral 159 indicates a mounting plate.

Mounted in the bore 126 is a sleeve 160 having a spool 161 slidably received therein. The spool 161 has an aperture 162 adapted to communicate a fluid chamber 167 within the spool with the mentioned port 62 via a port 163, a passageway 164 in the housing 118, an aperture 165 in the sleeve 160, and a chamber 166. This fluid chamber 167 further communicates with the chamber 155 in the bore 125 via a passageway 168 and the nozzle 154. Another fluid chamber 169 arranged in opposed relationship to the fluid chamber 167 communicates with the fluid chamber 138 in the bore 122 via passageways 170 formed at the midpoint of the spool 161, an aperture 171 formed at the midpoint of the sleeve 160, a passageway 172 in the housing 118, and a passageway 173 in the housing 117. The port 67, already mentioned in connection with FIG. 1, communicates with a chamber 176 via a passageway 174 in the housing 118 and an aperture 175 in the sleeve 160 and also communicates with the chamber 155 via an unshown conduit. The lower end of the bore 126 is pressure-tightly closed by a cap 177 which is retained in position by a bolt 179 via a retainer plate 178. A passageway shown at 180 is adapted to intercommunicate the reduced pressure chamber 135 and the fluid chamber 140 therethrough.

In the operation of the antiskid control system set forth in the foregoing with reference to FIGS. 1 to 3, it will be seen that the push rod 109 is thrust leftwardly, as seen in FIG. 2, upon depression of the brake pedal 70. The reactive piston 77 is thus caused to slide leftwardly via the resilient member 112 against the effect of the restoring spring 93. As a consequence, the grooves 23 and 95 intercommunicate, whereas the reactive piston shoulder 102 discommunicates the grooves 95 and 97 one with respect to the other. The reactive piston shoulder 103 further constricts the degree of communication between the groove 23 and the port 98.

If then the pump 11 is operating normally, and if there is no leakage in the entire hydraulic circuit, then the hydraulic pressure developed by the pump will be delivered to the fluid chamber 181 of the brake booster 19 via the groove 23, the groove 95, the passageway 104, the passageway 105, the reactive fluid chamber 91, the passageway 92 and the passageway 74b. Because of the resulting difference between hydraulic pressures developing on both sides thereof, the power piston 75 slides leftwardly against the bias of the restoring spring 81 thereby actuating the brake master cylinder 32 coupled to the piston rod 80. The pressure in the fluid chamber 181 is further delivered, on the one hand, to the fluid chamber 138 via the port 96, the conduits 60 and 61, the ports 62 and 163, the passageway 164, the apertures 165 and 171, and the passageways 172 and 173. On the other hand, the fluid pressure from the chamber 181 is delivered to the fluid chamber 145 via the conduits 60 and 63, the check valve 64 and the port 66.

The fluid pressure that has been introduced into the chamber 145 causes the piston 144, the plunger 143 and the piston 139 to travel leftwardly, to their respective positions illustrated in FIG. 3. The fluid pressure that has been admitted into the chamber 138 causes the piston 137, the plunger 134 and the valve 129 to travel leftward thereby unseating the latter from the seat member 128. Thereupon the fluid pressure from the port 33 of the tandem master cylinder 33 is delivered to the brake controls 40 of the respective front wheels 39 of the motor vehicle via the port 36, the passageway 132, the fluid chamber 131, the passageway 129a of the valve 129, the reduced pressure chamber 135, the passageway 180, the passageway 139a of the piston 139, the fluid chamber 140, the port 37 and the conduit 38. The fluid pressure from the other port 41 of the tandem master cylinder 33 is delivered, on the one hand, to the brake controls 47 of the respective front wheels 39 via the conduit 42 and 43, the ports 44 and 45 of the actuator unit 58, and the conduit 46. On the other hand, the fluid pressure from the port 41 of the master cylinder is delivered to the brake controls 53 of the rear wheels 52 via the conduits 42 and 48, the ports 49 and 50 of the actuator unit 59, and the conduit 51. The braking of the vehicle wheels is thus accomplished.

Upon release of the brake pedal 70, the push rod 109 and the reactive pistion 177 are caused to move back to their positions illustrated in FIG. 2 by the effect of the restoring spring 93 and another restoring spring, not shown, acting on the brake pedal 70. The groove 94 again intercommunicates the groove 23 and the port 98, while the groove 95 communicates with the groove 97. Consequently, the fluid chamber 181 communicates with the reservoir 12 via the passageways 74b and 92, the reactive chamber 91, the passageways 105 and 104, the grooves 95 and 97, the passageway 108, the port 29, and the conduits 28 and 27. The power piston 75 is caused by the restoring spring 81 to slide rightward while returning the hydraulic fluid from the chamber 181 to the reservoir 12 through the above stated path.

Proceeding to the description of antiskid control operation, it will be assumed that the computer 56 has just determined that the front wheels 39 are skidding on the basis of the signals delivered from the respective wheel sensors 54 and 55. The computer causes the solenoid coil 153 of the actuator unit 57 to carry a current, with the result that the plunger 151 moves to the left, as seen in FIG. 3, as dictated by the current value. Thus, the fluid pressures supplied to the port 62 and hence the port 163 of the actuator unit is returned to the reservoir 12 via the passageway 164, the aperture 165, the chamber 166, the aperture 162, the chamber 167, the passageway 168, the chamber 155, the port 67 and the conduit 68, so that the spool 161 moves upward, as seen in FIG. 3, under the influence of the fluid pressure in the chamber 169. Thereupon the fluid chamber 138 in the housing 117 also communicates with the reservoir 12 via the passageways 173 and 172, the aperture 171, the chamber 176, the aperture 175, the passageways 174, the port 67 and the conduit 68.

Because of the resulting reduction in the fluid pressure of the chamber 138, the piston 137, the plunger 134 and the valve 129 jointly move to the right as seen in FIG. 3, with the result that the valve 129 becomes seated against the seat member 128. The brake master cylinder 32 thus becomes discommunicated from the brake controls 40 of the vehicle front wheels 39, the master cylinder having been in communication with the brake controls via the reduced pressure chamber 135, the passageway 180, the passageway 139a of the piston 139, the fluid chamber 140, the port 37, and the conduit 38. The reduced pressure chamber 135 further increases in volume with the continued rightward travel of the plunger 134. The braking forces that have been applied to the front wheels 39 of the motor vehicle are thus suitably reduced.

As the skidding of the front wheels is successfully eliminated, the computer 56 ascertains this fact from the signals produced by the sensors 54. The computer 56 further functions to terminate the flow of, or to reduce the magnitude of, the current that has been flowing through the solenoid coil 153 of the actuator unit 57. As a consequence, the solenoid plunger 151 moves to the right to close the nozzle 154 as seen in FIG. 3, whereupon the fluid pressure in chamber 138 of the actuator unit 57 again rises to cause a leftward slide motion of the piston 137, the plunger 134, and the valve 129. With the vlave 129 thus unseated again from the seat member 128, the chambers 131 and 135 intercommunicate to permit the delivery of the fluid pressure from the brake master cylinder 32 to the brake controls 40 of the front wheels 39. The foregoing procedure may be repeated until the skidding of the wheels is completely eliminated.

In the event the pump 11 is not in normal operation, or in the event of some trouble in the hydraulic circuit such as, for example, leakage from the conduit 14, the required fluid pressure will not be delivered from the pump to the fluid chamber 181, FIG. 2, of the brake booster 19 when the brake pedal 70 is depressed to communicate the groove 23 with the groove 95 and to reduce the degree of communication between the groove 23 and the port 98 by the reactive piston shoulder 103. As the brake pedal is depressed further, however, the reactive piston 77 further travels leftward until the valve 84 becomes seated against the valve seat 106 formed in the reactive piston. The chamber 91 thus becomes discommunicated from the passageway 105. Succeedingly, the shoulder portion 86 of the valve 84 becomes unseated from the valve seat 85 of the valve seat piston 74, so that the fluid pressure from the emergency accumulator 17, FIG. 1, is delivered to the fluid chamber 181 via the conduit 18, the port 20, the chamber 83, and the passageways 74a and 74b.

The power piston 75 of the brake booster 19 is thus caused to slide to the left to actuate the brake master cylinder 32 with its piston rod 80. The fluid pressure from the chamber 181 of the brake booster 19 is further delivered to the chamber 138 of the unit 57 of the actuator 35 via the port 96, the conduits 60 and 61, the port 62, the port 163 of the actuator unit 57, the passageway 164, the aperture 165, the aperture 171 and the passageways 172 and 173. The fluid pressure from the brake booster chamber 181 is also delivered to the chamber 145 via the conduits 60 and 63, the check valve 64 and the port 66. The fluid pressure admitted into the chamber 145 causes the piston 144, the plunger 143 and the piston 139 to jointly move to the left, to their respective positions illustrated in FIG. 3.

The fluid pressure admitted into the chamber 138, on the other hand, causes a joint leftward sliding motion of the piston 137, the plunger 134, and the valve 129, thereby unseating the latter from the seat member 128. The fluid pressure from the port 33 of the brake master cylinder 32 is now delivered to the brake controls 40 of the respective front wheels 39 via the port 36, the passageway 132, the chamber 131, the passageway 129a of the valve 129, the chamber 135, the passageway 180, the passageway 139a of the piston 139, the chamber 140, the port 37, and the conduit 38. The fluid pressure from the other port 41 of the master cylinder 32 is likewise delivered to the brake controls 47 of the respective front wheels 39 via the conduits 42 and 43, the ports 44 and 45, and the conduit 46, and further to the brake controls 53 of the respective rear wheels 52 via the conduits 42 and 48, the ports 49 and 50 and the conduit 51. The braking of the front and rear wheels is thus accomplished.

It is possible that the fluid pressure that has been stored in the accumulator 17 is insufficient to cause the brake booster 19 to hydraulically actuate the tandem master cylinder 32. In this case the brake pedal 70 should be forced to its most depressed position so that the reactive piston 77, the valve seat piston 74, and the power piston 75 will jointly slide to the left. The master cylinder 32 can thus be mechanically actuated by the forcible depression of the brake pedal 70.

The power steering mechanism 24 operates by making use of hydraulic fluid which is also used in the brake booster 19. Hydraulic fluid from the pump 11 is supplied via the conduits 21 and 22 (FIG. 1) into the groove 23 (FIG. 2). In the condition shown in FIG. 2, the groove 23 is in communcation with the port 98, so that the hydraulic fluid from the pump 11 is supplied via the port 98 and the conduit 25 (FIG. 1) into the power steering mechanism 24, and serves to operate the latter. When the brake pedal 70 is depressed, the reactive piston 77 moves to the left as viewed in FIG. 2, so that the degree of communication between the groove 23 and the port 98 is reduced and less quantity of the hydraulic fluid is supplied to the power steering mechanism 24. It will be seen that no special pump other than the pump 11 is necessary for power steering and the single pump 11 is used both for the operation of the brake booster 19 and for the power steering mechanism 24.

The relief valve 69 is set to open at a pressure lower than the pressure at which a conventional relief valve built in the pump 11 opens. When the fluid pressure in the conduit 21 rises abnormally as by failure of the brake booster 19, the relief valve 69 opens to cause the fluid in the conduit 21 to flow into the power steering mechanism 24, so that the mechanism 24 is capable of being operated even in the event of booster failure. Of course, the steering mechanism 24 could be dispensed with. In this case, the relief valve 69 is unnecessary and only the relief valve built in the pump 11 operates when fluid pressure rises abnormally.

Figures 4, 5:
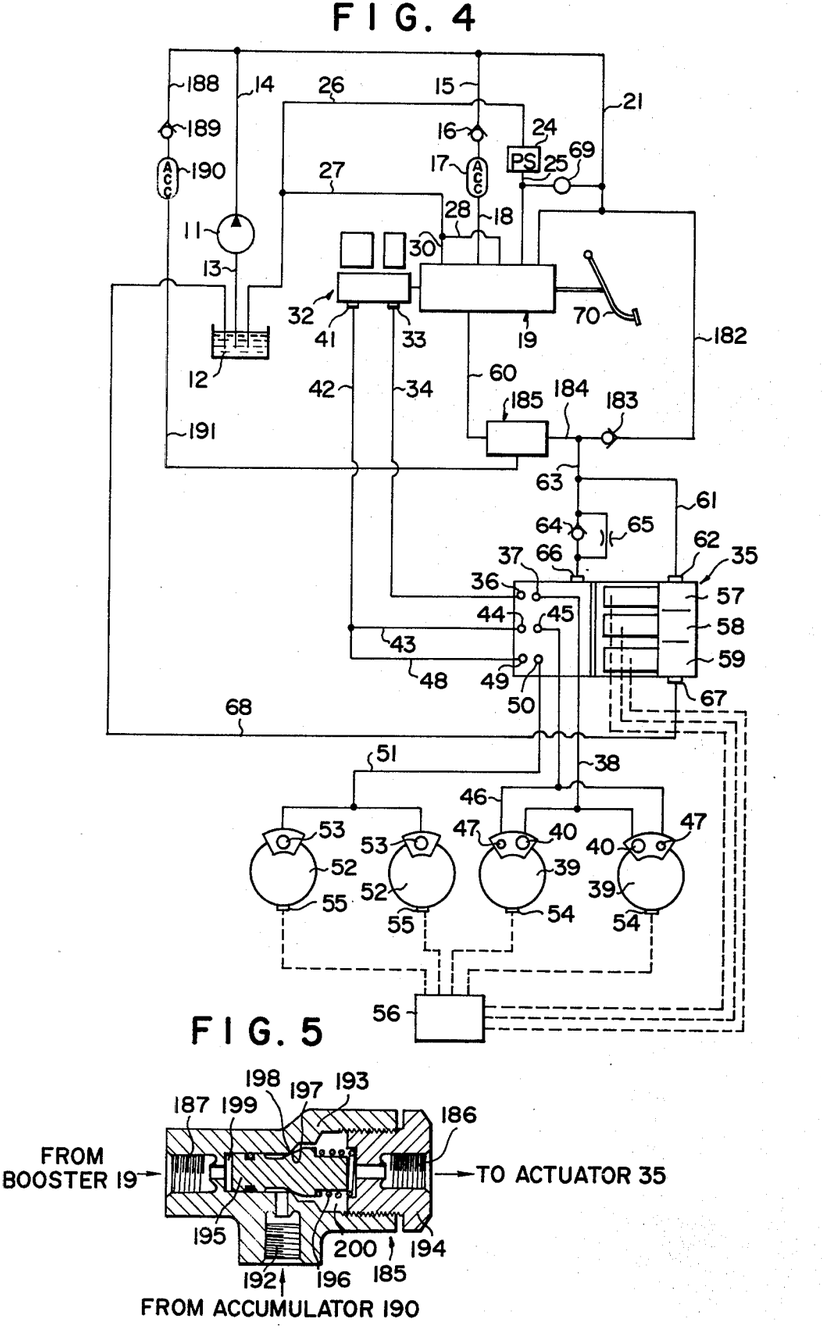
FIG. 4 is a schematic diagram of another preferred embodiment of the invention.
FIG. 5 is a side view, in longitudinal section, showing selector valve used in antiskid control system shown in FIG. 4.

FIG. 4 illustrates an alternative form of the preceding embodiment of the invention. It will be noted from FIGS. 1 and 4 that corresponding parts of these two systems are designated by like reference numerals. In the following description of this alternative antiskid control system, therefore, only those parts differing from the preceding embodiment will be explained in detail, the other parts being considered self-evident from the foregoing description. The conduit 21 connected to the conduit 14 extending from the pump 11 communicates with a selector valve 185 via a conduit 182, a check valve 183, and a conduit 184. As will be seen by referring to FIG. 5, the conduit 184 is connected to the port 186 of the selector valve 185. The conduit 184 also communicates with the conduit 63. The conduit 60 extending from the port 96 of the brake booster 19 is connected to the port 187, FIG. 5, of the selector valve 185. The conduit 14 further communicates with the port 192, FIG. 5, of the selector valve 185 via a conduit 188, a check valve 189, an accumulator 190, and a conduit 191.

As illustrated in detail in FIG. 5, the selector valve 185 includes a housing 193 with a plug 194 screw-threadedly fitted in its right hand end as seen in the drawing, the plug having the port 186 formed therethrough. A valve spool 195 is slidably mounted within the housing 193. A helical compression spring 196 arranged between the plug 194 and the valve spool 195 is effective to urge the latter leftwardly thereby causing its shoulder portion 197 to tend to seat against a valve seat 198 formed internally of the valve housing 193. Thus, in the illustrated position of the valve spool 195 relative to the valve housing 193, the ports 186 and 192 are discommunicated from each other. A fluid chamber 199 is defined on the left hand side of the valve spool 195, while another fluid chamber 200 is defined on the right hand side of the valve spool.

The operation of this second embodiment of the invention is set forth hereinbelow assuming that the pump 11 is not properly raising the hydraulic fluid from within the reservoir 12 or that there is some such trouble in the hydraulic circuit as leakage from the conduit 14. It may be worth mentioning at this juncture that the operations of this second embodiment for braking and antiskid control purposes are substantially the same as those previously set forth in connection with the preceding embodiment.

In the event of the above mentioned trouble, the fluid pressure in the conduit 182 drops. The fluid pressure in the conduit 184 also drops as for antiskid control operation. Consequently, the fluid pressure in the chamber 200 of the selector valve 185 becomes lower than that in the chamber 199 communicating with the conduit 60, so that the valve spool 195 moves to the right, as seen in FIG. 5, against the bias of the compression spring 196 thereby intercommunicating the ports 186 and 192. The fluid pressure from the accumulator 190 can now be delivered through the conduit 191, the port 192, the chamber 200, the port 186, and the conduits 184 and 63. The resulting operation of the actuator 35 will be apparent from the foregoing description of the preceding embodiment.

It will have been understood that in this second embodiment of the invention, the fluid pressure from the brake booster 19 is utilized to actuate the selector valve 185. The same objective can be accomplished, however, by introducing the braking pressure into the port 187 of the selector valve 185 for comparison with the fluid pressure in the other port 186, thereby detecting the malfunctioning of the pump 11 or like trouble. According to this latter scheme, however, the configuration of the valve spool 195 must be appropriately modified with a view to the booster stroke. Furthermore, since the brake pedal 70 must be depressed through a greater angle in the event of pump trouble or the like, this increased brake pedal stroke may be utilized to actuate a suitable electrical switch mechanism and hence the valve spool 195.

Figure 6:
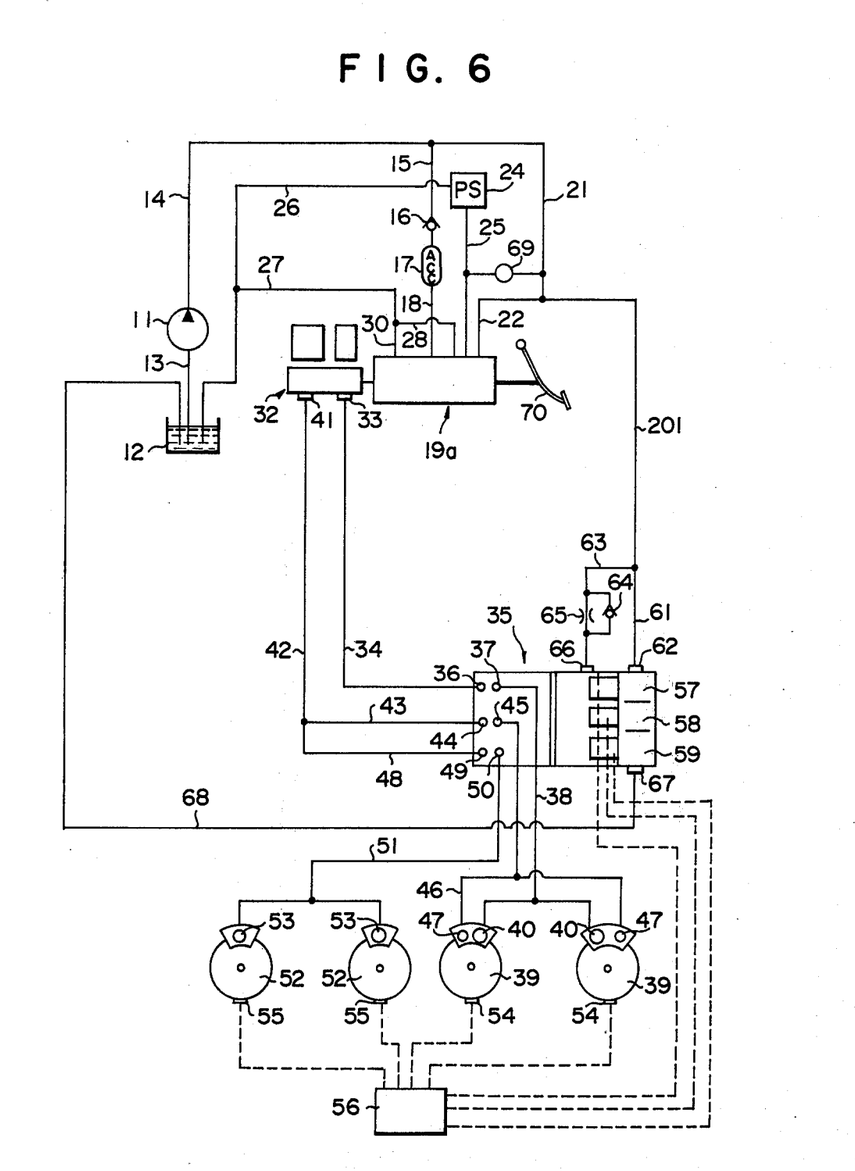
FIG. 6 is a schematic diagram of a further preferred embodiment of the invention.

In a further preferred embodiment of the invention illustrated in FIG. 6, the conduit 21 communicating with the pump 11 via the conduit 14 communicates not only with the brake booster 19a but with the port 62 of each of the actuator units 57 to 59 via conduits 201 and 61 on the one hand and, on the other hand, with the port 66 of each actuator unit via the conduit 63 and the check valve 64 or orifice 65. Other details of configuration are exactly as previously set forth in connection with the example shown in FIG. 1.

Figure 7:
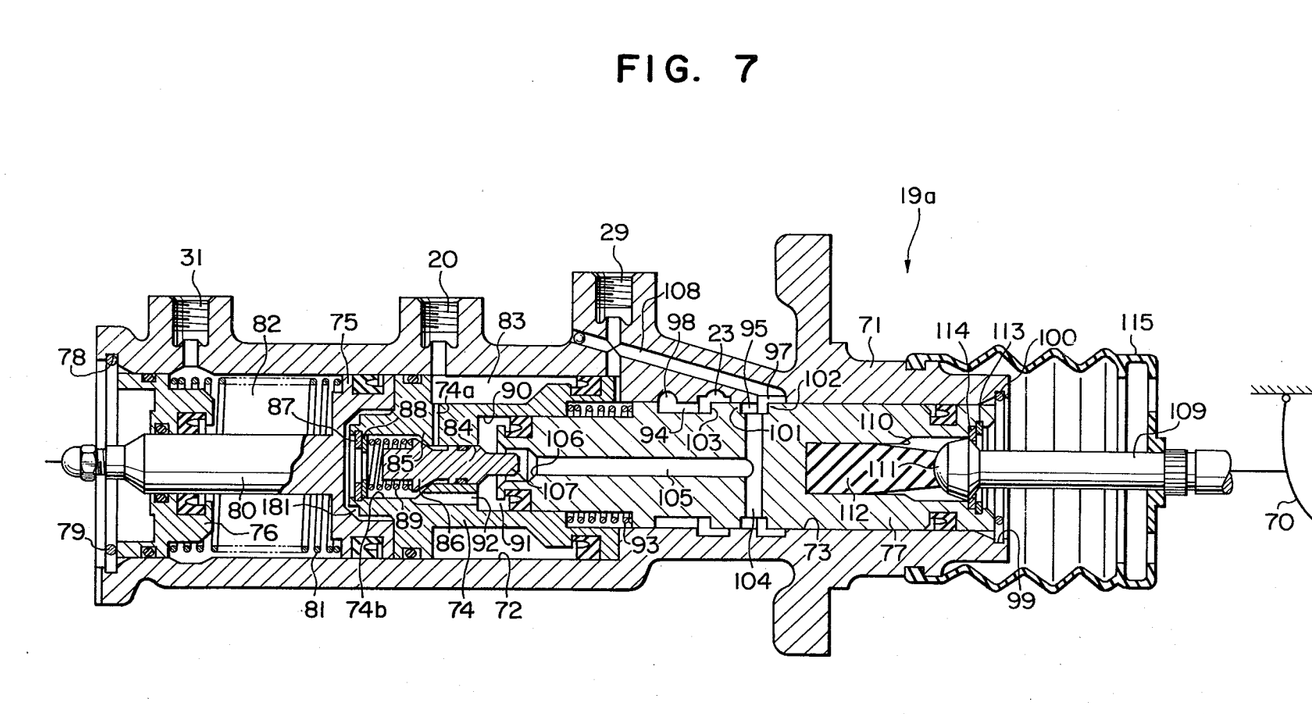
FIG. 7 is a side view, in longitudinal section, showing a brake booster used in the antiskid control system illustrated in FIG. 6.

As illustrated in FIG. 7, the brake booster 19a for use in the example shown in FIG. 6 can be of substantially the same construction as the brake booster 19 shown in FIG. 2, except that the port 96 communicating with the fluid chamber 181 is absent from the brake booster 19a. Each of the units 57 to 59 of the actuator 35 for use in this example shown in FIG. 6 can be of exactly the same construction as that shown in FIG. 3.

The braking and antiskid control operations of this third embodiment of the invention, configured as briefly explained in the foregoing, are considered to be apparent from the above described operations of the example illustrated in FIG. 1 for the same purposes. Described hereinbelow, therefore, is the operation of the example illustrated in FIG. 6 in the event the pump 11 fails to properly raise the hydraulic fluid from within the reservoir 12 or in the event there is some trouble in the hydraulic circuit such as leakage from the conduit 14.

In such cases, as previously mentioned in connection with the example illustrate in FIG. 1, the required fluid pressure will not be delivered from the pump 11 to the fluid chamber 181 of the brake booster 19a if the brake pedal 70 is depressed to such an extent as to communicate the groove 23 with the groove 95 and to reduce the degree of communication between the groove 23 and the port 98. As the brake pedal is depressed deeper, however, the valve 84 becomes seated against the valve seat 106 formed in the reactive piston 77, thereby discommunicating the fluid chamber 181 from the passageway 105 and hence from the groove 23. On the other hand, the shoulder portion 86 of the valve 84 becomes unseated from the valve seat 85 of the valve seat piston 74, so that the fluid pressure from the emergency accumulator 17 is now introduced into the fluid chamber 181 via the conduit 18, the port 20, the chamber 83 and the passageways 74a and 74b. The power piston 75 is thus caused to slide to the left, as seen in FIG. 7, to properly actuate the brake master cylinder 32 via the piston rod 80.

The operation of this example shown in FIG. 6 as set forth in the preceding paragraph is exactly the same as that of the example shown in FIG. 1. However, since the fluid chamber 181 of the modified brake booster 19a is not open through the port 96 like the corresponding fluid chamber of the brake booster 19, no fluid pressure is introduced at this time into the ports 62 and 66 of each of the units 57 to 59 of the actuator 35, it being understood that the conduit 201 carries no fluid pressure therein due to the assumed malfunctioning of the pump 11 or like trouble. As a consequence, the piston 137, the plunger 134 and the valve 129 of each actuator unit jointly slide to the right, as seen in FIG. 3, with the result that the valve 129 becomes seated against the seat member 128 to discommunicate the chambers 131 and 135 from each other. The piston 144, the plunger 143 and the piston 139 of each actuator unit also jointly slide to the right, and as the piston 139 thus moves into abutting contact with the stationary member 142, the chambers 135 and 140 become also discommunicated from each other.

The fluid pressure from the port 33 of the tandem master cylinder 32 can now be delivered to the brake controls 40 of the respective front wheels 39 via the conduit 34, the port 36 of the actuator unit 57, the passageway 132, the passageway 141, the chamber 140, the port 37 and the conduit 38. The fluid pressure from the other port 41 of the master cylinder is likewise delivered to the brake controls 47 of the respective front wheels via the conduits 42 and 43, the port 44 of the actuator unit 58, the port 45 and the conduit 46. The fluid pressure from the port 41 of the master cylinder is also delivered to the brake controls 53 of the respective rear wheels 52 via the conduits 42 and 48, the port 49 of the actuator unit 59, the port 50 and the conduit 51. The braking of the vehicle wheels can thus be accomplished. Since no fluid pressure is supplied to the chambers 138 and 145 of each actuator unit, the antiskid control of the vehicle wheels cannot be effected unless the trouble is remedied.

It will have been understood from the foregoing description that according to this final embodiment of the invention, the fluid pressure from the tandem brake master cylinder is successfully delivered to the vehicle wheels via bypasses formed in the actuator units even when the required fluid pressure is not supplied from the pump to the brake booster or to the actuator units. It is accordingly possible to brake the vehicle wheels by the depression of the brake pedal in the usual manner.

Having thus described the several useful and novel features of the antiskid control system according to the invention, it is believed that the many objects for which it has designed have been fully accomplished. However, while the invention has been shown and described herein in terms of several preferred embodiments thereof, many modifications of such specifically disclosed embodiments may well occur to those skilled in the art within the broad teaching hereof. The invention, therefore, should be interpreted broadly and in a manner comprehensive of all such modifications remaining within the scope of the following claims.

What is claimed is:

1. An antiskid control system for a motor vehicle comprising, in combination:
- a source of fluid pressure;
- a brake master cylinder;
- brake booster means arranged between said source and said brake master cylinder, said brake booster means including valve means adapted to be operated by the motor vehicle driver for actuating said brake master cylinder;
- computer means for sensing the skidding of the wheels of the motor vehicle;
- actuator means normally receiving the fluid pressure from said booster for permitting the delivery therethrough of the braking pressure from said brake master cylinder to said wheels, said actuator means including means responsive to said computer means whereby said actuator means is caused to control the delivery of the braking pressure to said wheels when their skidding is sensed by said computer means;
- first accumulator means for delivering fluid pressure to said brake booster means to permit the same to actuate said brake master cylinder in the event said source fails to deliver the fluid pressure to said brake booster means;
- second accumulator means; and
- pressure-sensitive valve means arranged between said second accumulator means and said actuator means for permitting the delivery therethrough of the fluid pressure from said second accumulator means to said actuator means in the event said source fails to deliver the fluid pressure thereto.

2. The antiskid control system as set forth in claim 1 wherein said pressure-sensitive valve means is adapted to communicate said second accumulator means with said actuator means when the fluid pressure from said brake booster means exceeds the fluid pressure from said source.

3. An antiskid control system for a motor vehicle driven by a driver comprising:
- a source of fluid pressure;
- a brake master cylinder;
- brake booster means disposed between said source of fluid pressure and said brake master cylinder and having means for controlling hydraulic fluid flow from said source of fluid pressure according to control by the driver to actuate said brake master cylinder;
- computer means for sensing a skid condition of wheels of the motor vehicle to issue a signal according to said skid condition;
- actuator means disposed between said brake master cylinder and said wheels to supply fluid pressure therethrough to said wheels for braking operation and directly deriving from said brake booster means hydraulic fluid for actuation thereof, said actuator means having means for controlling fluid pressure from said brake master cylinder to said wheels according to the signal of said computer means; and
- accumulator means for supplying fluid pressure to said actuator means for braking and skid control operations in the event said source of fluid pressure fails.

4. The antiskid control system as set forth in claim 3 wherein said accumulator means is provided between said source of fluid pressure and said brake booster means.

5. The antiskid control system as set forth in claim 4 wherein said brake booster means is capable of fluid pressure actuation of said brake master cylinder in at least first and second operative positions of said valve means, said brake booster means permitting the delivery therethrough of the fluid pressure from said source to said actuator means in said first operative position and permitting the delivery therethrough of the fluid pressure from said accumulator means to said actuator means in said second operative position.

6. An antiskid control system as set forth in claim 3, wherein said actuator means includes first valve means for controlling hydraulic fluid from said brake master cylinder to said wheels, second valve means for deriving said hydraulic fluid from said brake booster means to regulate said first valve means, and electromagnetic means for controlling said second valve means according to said signal of said computer means.

7. An antiskid control system as set forth in claim 6, wherein said actuator means further includes means for regulating said first valve means to change the flow of the hydraulic fluid therethrough so as to change the braking force in said wheels according to the actuation of said second valve means.

8. An antiskid control system for a motor vehicle driven by a driver comprising:
- a source of fluid pressure;
- a brake master cylinder;
- brake booster means disposed between said source of fluid pressure and said brake master cylinder and having means for controlling hydraulic fluid flow from said source of fluid pressure according to control by the driver to actuate said brake master cylinder;
- computer means for sensing skid condition of wheels of the motor vehicle to issue a signal according to said skid condition;
- actuator means disposed between said brake master cylinder and said wheels to supply fluid pressure therethrough to said wheels for braking operation and directly deriving from said brake booster means hydraulic fluid for actuation thereof, said actuator means having means for controlling fluid pressure from said brake master cylinder to said wheels according to the signal of said computer means, and
- bypass means for supplying fluid pressure from said brake master cylinder to said wheels in the event said source of fluid pressure fails.

9. An antiskid control system as set forth in claim 8, wherein said actuator means includes first valve means for controlling hydraulic fluid from said brake master cylinder to said wheels, second valve means for deriving said hydraulic fluid from said brake booster means to regulate said first valve means, and electromagnetic means for controlling said second valve means according to said signal of said computer means.

10. An antiskid control system as set forth in claim 9, wherein said actuator means further includes means for regulating said first valve means to change the flow of the hydraulic fluid therethrough so as to change the braking force in said wheels according to the actuation of said second valve means.

11. The antiskid control system as set forth in claim 10 further comprising accumulator means provided between said source of fluid pressure and said brake booster means to permit the latter to effect fluid pressure actuation of said brake master cylinder in the event said source fails to deliver the fluid pressure to said brake booster means.

* * * * *